US008671011B1

(12) United States Patent
Merryman et al.

(10) Patent No.: US 8,671,011 B1
(45) Date of Patent: Mar. 11, 2014

(54) METHODS AND APPARATUS FOR GENERATING AN ONLINE MARKETING CAMPAIGN

(75) Inventors: John F. Merryman, New York, NY (US); Dennis Lipovsky, New York, NY (US); Nathaniel Stevens, New York, NY (US)

(73) Assignee: Yodle, Inc., New York, NY (US)

( * ) Notice: Subject to any disclaimer, the term of this patent is extended or adjusted under 35 U.S.C. 154(b) by 829 days.

(21) Appl. No.: 12/129,590

(22) Filed: May 29, 2008

(51) Int. Cl.
*G06Q 10/00* (2012.01)
*G06Q 30/00* (2012.01)

(52) U.S. Cl.
USPC ..... 705/7.29; 705/7.33; 705/7.36; 705/14.41; 705/14.42; 705/14.43; 705/14.54

(58) Field of Classification Search
USPC ............... 705/7.29, 7.33, 7.36, 14.43, 14.41, 705/14.42, 14.54
See application file for complete search history.

(56) References Cited

U.S. PATENT DOCUMENTS

| | | | |
|---|---|---|---|
| 7,801,899 B1 * | 9/2010 | Spitkovsky | 705/14.4 |
| 8,180,760 B1 * | 5/2012 | Carver et al. | 707/708 |
| 2002/0120505 A1 * | 8/2002 | Henkin et al. | 705/14 |
| 2003/0055816 A1 * | 3/2003 | Paine et al. | 707/3 |
| 2005/0097204 A1 * | 5/2005 | Horowitz et al. | 709/223 |
| 2005/0120006 A1 * | 6/2005 | Nye | 707/3 |
| 2005/0149396 A1 * | 7/2005 | Horowitz et al. | 705/14 |
| 2005/0228797 A1 * | 10/2005 | Koningstein et al. | 707/100 |
| 2006/0074746 A1 | 4/2006 | Kline et al. | |
| 2006/0074747 A1 | 4/2006 | Kline et al. | |
| 2006/0074748 A1 | 4/2006 | Kline et al. | |
| 2006/0074749 A1 | 4/2006 | Kline et al. | |
| 2006/0074751 A1 | 4/2006 | Kline et al. | |
| 2006/0149625 A1 * | 7/2006 | Koningstein | 705/14 |
| 2006/0173744 A1 * | 8/2006 | Kandasamy et al. | 705/14 |
| 2006/0242017 A1 * | 10/2006 | Libes et al. | 705/14 |
| 2007/0027771 A1 * | 2/2007 | Collins et al. | 705/14 |
| 2007/0112747 A1 * | 5/2007 | Haigh et al. | 707/4 |
| 2007/0112754 A1 * | 5/2007 | Haigh et al. | 707/5 |
| 2007/0150344 A1 * | 6/2007 | Sobotka et al. | 705/14 |
| 2007/0150346 A1 * | 6/2007 | Sobotka et al. | 705/14 |
| 2007/0156757 A1 * | 7/2007 | Tang et al. | 707/104.1 |
| 2007/0179832 A1 * | 8/2007 | Reich | 705/10 |

(Continued)

OTHER PUBLICATIONS

Chen, "Advertising Keyword Suggestion Based on Concept Hierarchy," Feb. 11-12, 2008, WSDM '08, Proceedings of the international conference on Web search and data mining, pp. 251-260.*

(Continued)

*Primary Examiner* — Justin M Pats
*Assistant Examiner* — Ivan R Goldberg
(74) *Attorney, Agent, or Firm* — Wolf, Greenfield & Sacks, P.C.

(57) ABSTRACT

Embodiments of the invention relate to generating an online marketing campaign that comprises a list of keywords to be purchased from a search engine. Keywords for a business' marketing campaign may be selected from a pre-defined template of keywords for the business service category into which the business falls. In addition, the business may add keywords not found in the template into its marketing campaign. The performance of the non-template keywords added by the business may be evaluated and, if they are determined to have been performed well, may be added into the template so that they may be used in the marketing campaigns of other businesses in the business service category.

42 Claims, 5 Drawing Sheets

(56) References Cited

U.S. PATENT DOCUMENTS

| | | | |
|---|---|---|---|
| 2007/0214048 A1* | 9/2007 | Chan et al. | 705/14 |
| 2007/0233566 A1* | 10/2007 | Zlotin et al. | 705/14 |
| 2007/0239528 A1 | 10/2007 | Xie et al. | |
| 2007/0288451 A1* | 12/2007 | Meyer et al. | 707/5 |
| 2008/0243613 A1* | 10/2008 | Silvestri et al. | 705/14 |
| 2008/0249853 A1* | 10/2008 | Dekel et al. | 705/14 |
| 2008/0288328 A1* | 11/2008 | Minor et al. | 705/10 |
| 2008/0288347 A1* | 11/2008 | Sifry | 705/14 |
| 2009/0112688 A1* | 4/2009 | Hart et al. | 705/10 |
| 2009/0138445 A1* | 5/2009 | White et al. | 707/3 |
| 2009/0228353 A1* | 9/2009 | Achan et al. | 705/14 |
| 2009/0248486 A1* | 10/2009 | Gupta et al. | 705/10 |

OTHER PUBLICATIONS

Taylor, "Growing Your Business with Google," 2005, Penguin Group, pp. 215-218, 226.*

White, U.S. Appl. No. 60/990,103, filed Nov. 26, 2007.*

Bartz, "Logistic Regression and Collaborative Filtering for Sponsored Search Term Recommendation," 2006, Second Workshop on Sponsored Search Auctions, vol. 5, pp. 1-5.*

* cited by examiner

METHODS AND APPARATUS FOR GENERATING AN ONLINE MARKETING CAMPAIGN

FIELD OF THE INVENTION

Aspects of the invention relate to online marketing campaigns.

DESCRIPTION OF RELATED ART

Businesses often use advertising as a business development tool to call public attention to their products and/or services. With the advent and popularity of the Internet, advertising via the World Wide Web (WWW) has become common. Ways to advertise one's business via the WWW include purchasing keywords from a search engine and listings in an online directory.

A search engine is a computer program that searches the Internet and provides and displays a list of documents and/or web pages that are relevant to a set of user-provided keywords. Most search engines have a web-based user interfaces, via which users can be input search queries to the search engine and view results returned from the search engine.

Many search engines allow a business to purchase keywords so that when a user of the search engine uses the purchased keywords or some subset of those keyword in a search query to the search engine, the search engine displays an advertisement including a hyperlink to a web site for the business along with the results from the search performed by the search engine. When the user clicks on the hyperlink in the business' advertisement, the business is charged the "purchase price" of the keyword that triggered display of the advertisement.

Frequently, many different businesses purchase the same keywords from the same search engine. For example, many different plumbers advertising their services on the Internet might purchase the keyword "plumber." Because there may be too many advertisements to display in response to a user inputting "plumber" as a search term, the search engine determines which businesses' advertisements to display and in what order to display them.

This typically is done by allowing businesses to "bid" on the purchase price for the keywords that they purchase. The frequency with which the search engine displays a particular business' advertisement (and the order of the business' advertisement in the list of advertisements) when a user inputs a search query that includes a keyword purchased by the business depends on the amount that the business bid on the keyword relative to the amount that other businesses bid on the same keyword, with priority being given to those businesses that bid higher amounts.

As mentioned above, another way to advertise one's business on the Internet is using online directories. An online directory is a directory with a defined set of categories, such as, for example, an online phone book. A business advertises in an online directory by deciding in which categories it is desired to list the business and purchasing a listing in each of these categories.

SUMMARY

One embodiment of the invention is directed to a method for generating keywords to be used in an online marketing campaign. The method comprises acts of: reviewing at least one taxonomy that specifies at least one business service category and a list of keywords that represent a proposed best practices list of keywords for the at least one business service category for use in a search engine and/or online directory; adopting an online marketing campaign that is based, at least in part, on the taxonomy but that employs at least one new keyword for the at least one business service category that is not included in the proposed best practices list; evaluating the performance of the new keyword; and when it is determined that the new keyword satisfies at least one performance criterion, adding the new keyword to the best practices list of keywords for the at least one business service category.

Another embodiment is directed to a method of adaptively updating at least one taxonomy that specifies at least one business service category and a list of keywords that represent a proposed best practices list of keywords for the at least one business service category for use in a search engine and/or online directory. The method comprises acts of: (A) generating a plurality of marketing campaigns using the proposed best practices list of keywords, so that each of the plurality of marketing campaigns includes at least some the keywords from the proposed best practices list and at least some of the plurality of marketing campaigns include at least one new keyword; (B) evaluating the performance of the new keyword; (C) determining whether the new keyword satisfies at least one performance criterion; and (D) when it is determined in the act (C) that the new keyword satisfies the at least one performance criterion, updating the at least one taxonomy to add the new keyword to the best practices list of keywords for the at least one business service category.

A further embodiment is directed to a method of establishing bidding for keywords in an online marketing campaign. The method comprises acts of: (A) determining whether the online marketing campaign satisfies at least one evaluation criterion for a given time period; (B) when it is determined that the marketing campaign satisfies the at least one evaluation criterion for the given time period, applying a first process to establish a first bidding approach for keywords in the online marketing campaign for a succeeding time period; and (C) when it is determined that the marketing campaign does not satisfy the at least one evaluation criterion for the given time period, applying a second process to establish a second bidding approach for keywords in the online marketing campaign for the succeeding time period.

DETAILED DESCRIPTION

Applicants have appreciated that when purchasing search engine keywords to advertise a business it is desirable to select keywords that will generate traffic to the business' web site and ultimately generate revenue for the business. Applicants have further appreciated that in many situations it is desirable to set keyword bids so that higher bids are placed on keywords that are more likely to generate traffic to the business' web site and lower bids are placed on keywords that are less likely to do so. Similarly, when advertising a business in an online directory it is desirable to select categories in which to list the business that are most likely to generate revenue for the business.

Applicants have appreciated that, conventionally, the selection of search engine keywords and/or categories in an online directory to use in advertising a business has been done in an ad hoc manner. That is, someone wishing to advertise his business using a search engine or online directory would select search engine keywords or categories in an online directory that he or she believed would generate web site traffic and/or revenue for the business, or would hire an advertising agency to help select search engine keywords or categories in an online directory. Whether done by the business or an agency, the approach for selecting keywords was ad hoc. There has been no systematic way to select keywords or categories that are optimized to generate traffic to a business' web site and/or increase revenue for the business. As a result, businesses may engage in online advertising campaigns that do not maximize traffic to the business' web site, or that may generate traffic to the web site, but do not optimally increase the business' revenue. In such situations, a business may not receive the full benefit of its money spent on one or more online marketing campaigns.

Some embodiments of the invention address some of these drawbacks of conventional techniques for selecting search engine keywords and/or categories in an online directory to use in online advertising campaigns. However, not every embodiment addresses every one of these drawbacks, and some embodiments may not address any of them. As such, it should be appreciated that invention is not limited to addressing all or any of the above-discussed drawbacks of these conventional techniques.

Embodiments of the invention relate to using a template of best-practices keywords for a particular business area. When a business in the business area desires to advertise by purchasing a keywords, it may select the keywords to purchase using the keywords from the template. In addition, in some embodiments, the performance of keywords that are not in the template may be evaluated and, if determined to have performed well, may be added to the template so that they may be used in other online marketing campaigns.

As discussed above, some embodiments of the invention relate to generating an online marketing campaign for a business using a template of keywords. This may be done in any suitable way, as the aspects of the invention relating to using a template are not limited to any particular implementation technique.

For example, in some embodiments, a taxonomy that includes a list of business service categories may be defined and a keyword template that includes a list of keywords may be maintained for each business service category. When a business wishes to initiate an online search engine marketing campaign, it may select the business service category or categories in the taxonomy that are of interest (e.g., where the business would like to see an increase in revenue), and use the keywords in the template(s) for the selected category or categories in its online marketing campaign.

Applicants have appreciated that such a taxonomy may include a large number of business service categories and that, when the number of business service categories is large, a business may have difficulty identifying the business service category or categories of interest. Thus, in some embodiments, the taxonomy may be organized to enable businesses to more easily locate the business service category or categories of interest. This may be done in any suitable way, as the invention is not limited in this respect.

In some embodiments, the taxonomy may be organized hierarchically, such that related business service categories are grouped together into business segments. For example, the business segment "Dentist" may include business service categories such as "General Dentistry," "Cosmetic Dentistry," "Teeth Whitening," "Pediatric Dentistry," and "Dental Implants." Thus, rather than having to search through all the business service categories to identify the one or ones of interest, a business can identify the business segment or segments of interest and can look at the business service categories within these business segment(s) to identify those that are relevant and of interest.

In the example above of a hierarchical taxonomy, the taxonomy has two levels (i.e., the business segment level and the business service category level). However, the aspect of the invention that relates to a taxonomy is not limited in this respect, as the taxonomy may have any suitable number of levels. For example, in some embodiments, a taxonomy may have three levels in which related business service categories are grouped into business segments and related business segments may be grouped together into industries. That is, for example, the industry "Health Care" may include business segments such as "Physician," "Dentist," and "Physical Therapist," and each of these business segments may include one or more business service categories.

When a business identifies a business service category in the taxonomy that is of interest, a marketing campaign may be generated for the business using the template associated with the identified business service category. The template may include any suitable information, as the aspect of the invention that relates to using a template is not limited in this respect.

For example, in some embodiments, the template may include a list of recommended search engine keywords to be purchased in an online marketing campaign that are anticipated to be effective in generating web site traffic and/or revenue for a business in the relevant business service category. In some embodiments, the template may also specify a match-type for each keyword in the template. A match type is an indication to the search engine of under what conditions the business' advertisement is to be displayed when a search engine user inputs the keyword to the search engine in a search query. Any suitable match type may be used, as aspects of the invention that relate to the information included in the template are not limited in this respect.

For example, in some embodiments, the match type for a keyword may specify broad match, phrase match, exact match, or negative. A match type of broad match may indicate to the search engine to display a business' advertisement when a user's inputted search query includes the terms of the keyword (or singular/plural forms and synonyms of these terms) in any order and possibly along with other terms. For example, if a business' campaign includes the keyword "teeth whitening" with a match type of broad match, the business' advertisement would be available to be displayed in response to user inputted search queries, such as "whitening teeth," "tooth whitening," and "where to go for teeth whitening."

A match type of phrase match may indicate to the search engine to display a business' advertisement only when a user's inputted search query includes the terms of the keyword in the same order, and possibly with other terms before or after the phrase. For example, if a business' campaign includes the keyword "teeth whitening" with a match type of phrase match, the business' advertisement would be available to be displayed in user inputted search queries, such as "locations for teeth whitening" and "teeth whitening in New York," but not in response to queries such as, "whitening teeth" or "whitening for teeth."

A match type of exact match may indicate to the search engine to display a business' advertisement only when a user's inputted search query includes the terms of the keyword in the same order without any other terms in the query. For example, if a business' campaign includes the keyword "teeth whitening" with a match type of exact match, the business' advertisement would be available to be displayed only in response to the search query, "teeth whitening," and not other search queries.

A match type of negative for a keyword may indicate to the search engine to not display the business' advertisement in response to any user inputted search query that includes the keyword.

The match types described above are only some examples of match types that may be used. Different search engines allow the user to specify different match types for keywords and may use different to terms for some of the match types described above. The aspects relating to match type described herein are not limited to use with any particular type of search engine, and the match types for a template can be adapted to correlate to those offered by any search engine.

In some embodiments, the template for a business service category may also specify a listing type for each keyword. The listing type may specify, for example, whether the keyword is a search engine keyword to be purchased or an online directory category in which to list the business. Thus, for example, if a business' online marketing strategy employs purchasing keywords from search engines, the keywords which are indicated by the listing type as search engine keywords may be used, and if the business' online marketing strategy employs listing the business in an online directory, the keywords that are indicated by the listing type as online directory keywords may be used.

In situations where a business' marketing campaign involves purchasing search engine keywords, the keywords to be purchased may be determined using the keywords in the template(s) for the business service category or categories into which the business falls. This may be advantageous because the keywords used in the campaign are generated from a list of best-practices keywords, rather than via an ad hoc selection technique. In addition, in some embodiments, the list of best-practices keywords in the template may be adaptive, so that it is updated to include keywords that are determined to perform well and/or to remove keywords that are determined to perform poorly. Thus, a business whose marketing campaign is generated from the template benefits from previous experience with the keywords in other marketing campaigns.

In some embodiments, the business is not restricted to using the keywords suggested by the template, and may be able specify that certain of the keywords from the template should be excluded from its marketing campaign and/or may add keywords to its campaign that are not in the template. In addition, once the keywords in a business' marketing campaign have been purchased from one or more search engines, the business may add keywords to or remove keywords from the campaign based on the effectiveness of the campaign.

Some search engines allow advertisers to specify which user-inputted queries their advertisements will appear in based on the geographical location from which the query originated. For example, an advertiser can specify that he wants his advertisement displayed in response to search queries that originated from Manhattan, New York City, N.Y., the United States, or any other desired geographical area. In this way, a local business can prevent its advertisement from being displayed to search engine users who are geographically remote from the business, and who are not likely to be potential customers of the business. Search engines can determine the geographic location from which a user's query originated in a variety of ways, such as, for example, using the source IP address specified in the user's query.

However, Applicants have appreciated that this technique for limiting the geographic scope in which a business' advertisements are displayed may exclude some potential customers of the business from viewing its advertisement, as users that are remote from a particular geographic location may be potential customers of businesses local to that geographic location. For example, a user in California who plans to move to Manhattan and buy a home there may input a search query to a search engine such as, "real estate agent Manhattan." If a real estate agent in Manhattan has purchased the keywords "real estate agent Manhattan," but has instructed the search engine to limit the geographic scope in which his advertisement is displayed to queries originating in New York City, then his advertisement may not be displayed to the user in California who wishes to hire a real estate agent in Manhattan.

Thus, in some embodiments, rather than relying on the search engine to limit the geographical area in which an advertisement is displayed, keywords from the template associated with a business service category in which a business falls may be combined with geographical terms (hereinafter, "geo-terms") to generate the keywords that are to ultimately be purchased from the search engine. Thus, for example, a business may instruct the search engine not to limit its advertisements to being displayed only in a particular geographic scope or may instruct the search engine to limit its advertisements to being displayed in a very board geographic scope (e.g., the entire United States), and may rely on geo-terms to have its advertisement displayed to relevant users.

For example, in some embodiments, a separate taxonomy of geo-terms for particular locations may be maintained. For example, for New York City, the geo-terms in the taxonomy may include "New York City," "NYC," "Manhattan," "Soho," "TriBeCa," "Midtown, N.Y." and "10023." In some embodiments, as with the keywords in the template, a business may specify certain of the geo-terms from the list in the taxonomy that it does not wish to use in its marketing campaign and may add geo-terms to its campaign that are not in the list in the taxonomy. Additionally, in some embodiments, the list of geo-terms may specify match types for the geo-terms, including any of those described above or any other suitable match types.

A marketing campaign for a business may be generated using both the keywords from the template and the geo-terms in any suitable way, as the invention is not limited in this respect. For example, in some embodiments a marketing campaign may be generated by concatenating keywords from the template(s) associated with business service categories selected by the business with the geo-terms associated with the locations selected by the business. This may be done in any suitable way.

For example, in some embodiments, the keywords for a marketing campaign may be generated by taking the cross-product of the template keywords and the geo-terms. However, the invention is not limited in this respect as the keywords for the marketing campaign may be generated by concatenating the template keywords and geo-terms in any suitable way.

In some embodiments, the template keywords and geo-terms added by the business may be included in this process and template keywords and geo-terms that the business has requested to exclude may be excluded from this process.

Figure 1:
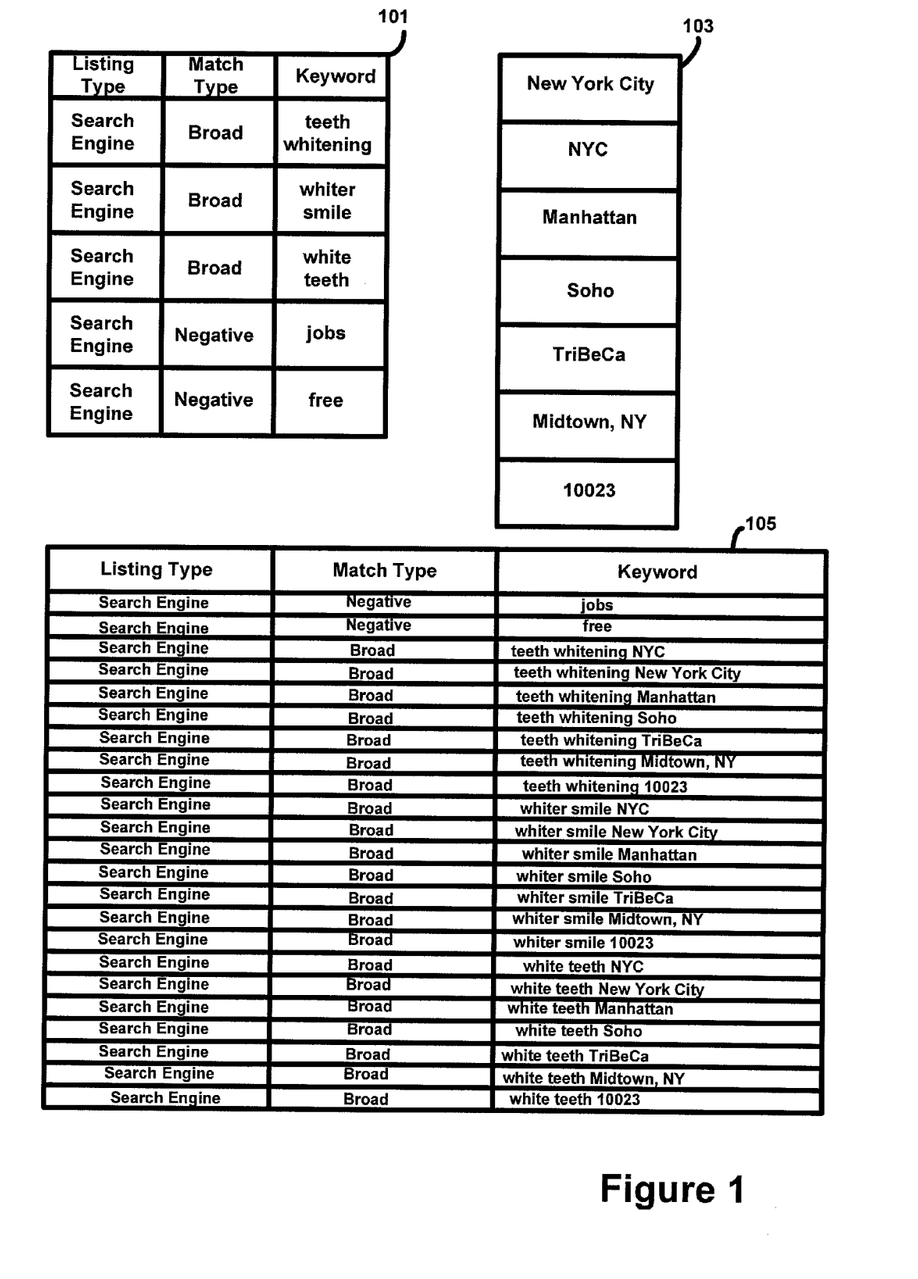
FIG. 1 is a diagram of keywords for a marketing campaign generated using template keywords and geo-terms.

FIG. 1 illustrates an example of generating a marketing campaign by taking the cross-product of template keywords and geo-terms. In this example, a keyword template 101 for a business service category includes the keywords "teeth whitening," "whiter smile," and "white teeth," and the negative keywords "jobs" and "free." A geo-term listing 103 for the location selected by the business includes the geo-terms "New York City," "NYC," "Manhattan," "Soho," "TriBeCa," "Midtown, N.Y." and "10023."

The table 105 shows a list of keywords to be used in the marketing campaign, generated by taking the cross-product of the keywords from template 101 and the geo-terms from the listing 103. As can be seen, in one embodiment, the negative keywords are not included in the cross-product because it is desired that the negative keywords exclude the advertisement from being displayed in response to all queries that include those terms, and not just queries from a particular geographic area.

Applicants have appreciated that when multiple businesses in the same business service category advertise by purchasing keywords from one or more search engines, the experiences of some businesses in the business service category may be used to alter or adjust the marketing campaigns of other businesses. This can be done to add or remove keywords in any suitable manner.

For example, in some embodiments, an online marketing campaign may be generated for a business that includes at least one keyword added to the campaign that is not present in the template for the business service category or categories in the taxonomy in which the business falls. The performance of the non-template keyword added by the business may be evaluated in any suitable manner. If the newly added keyword has performed well for the business, it may be added to the template(s) for the business service category or categories in which the business falls in any suitable way, as the invention is not limited in this respect. In this manner, the template may continue to learn and adapt from the collective experience of multiple different campaigns across multiple different businesses, thereby providing a best practices approach whereby subsequent campaigns can benefit from the experiences of those that preceded it. In some embodiments, the number of campaigns accessing the template can be large (e.g., on the order of tens, hundreds, thousands, or more), which provides a large data sample of collective experience.

Figure 2:
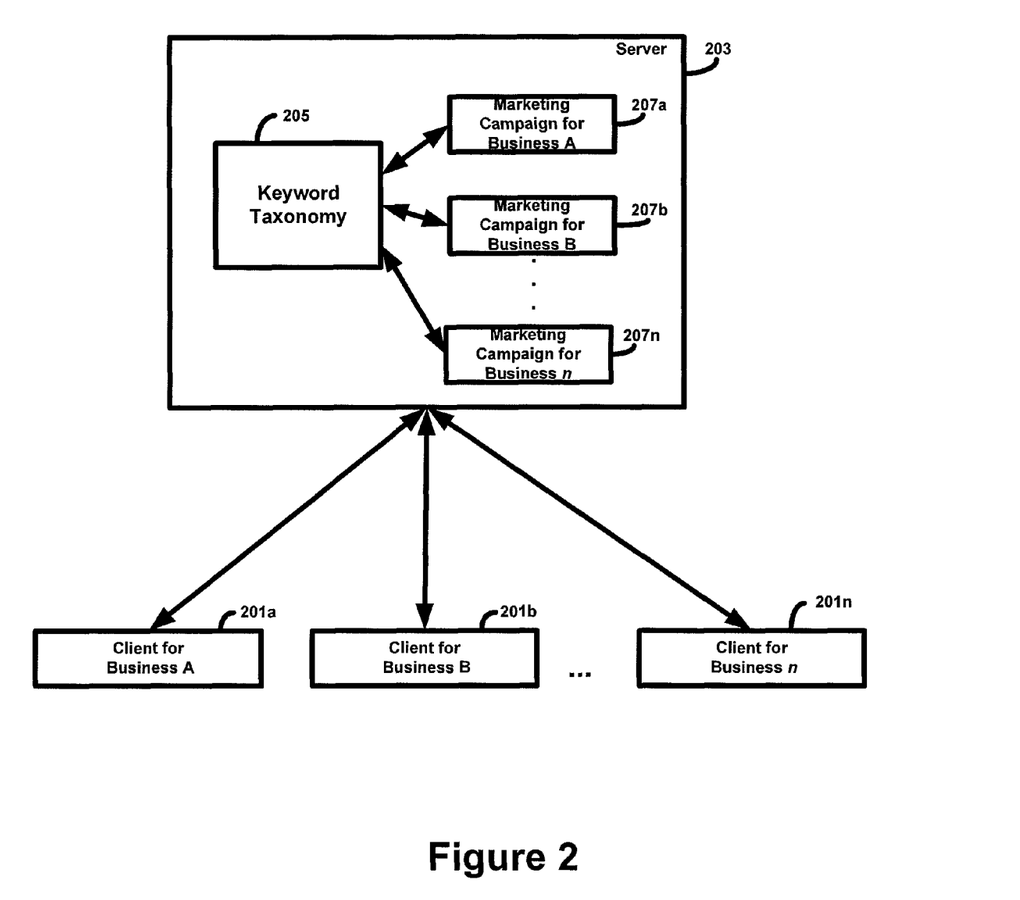
FIG. 2 is a block diagram of an illustrative system for generating online marketing campaigns from a keyword taxonomy.

In one example, shown in FIG. 2, client computers 201*a*, 201*b*, and 201*n* for a plurality of businesses (i.e., businesses A, B, . . . , n) may communicate with a server 203, which generates online marketing campaigns for these businesses using a keyword taxonomy 205. Server 203 generates a marketing campaign 207 for each business (i.e., marketing campaign 207*a* is generated for business A, marketing campaign 207*b* is generated for business B, and marketing campaign 207*n* is generated for business n). Some of these businesses may add keywords to their respective marketing campaigns that are not included in their business service category or categories in keyword taxonomy 205. The performance of such keywords may be tracked (e.g., by server 203 or otherwise) and, if the keywords are determined to perform well, they may be added into the keyword taxonomy. This may be done in any suitable way, as the invention is not limited in this respect.

Figure 3:
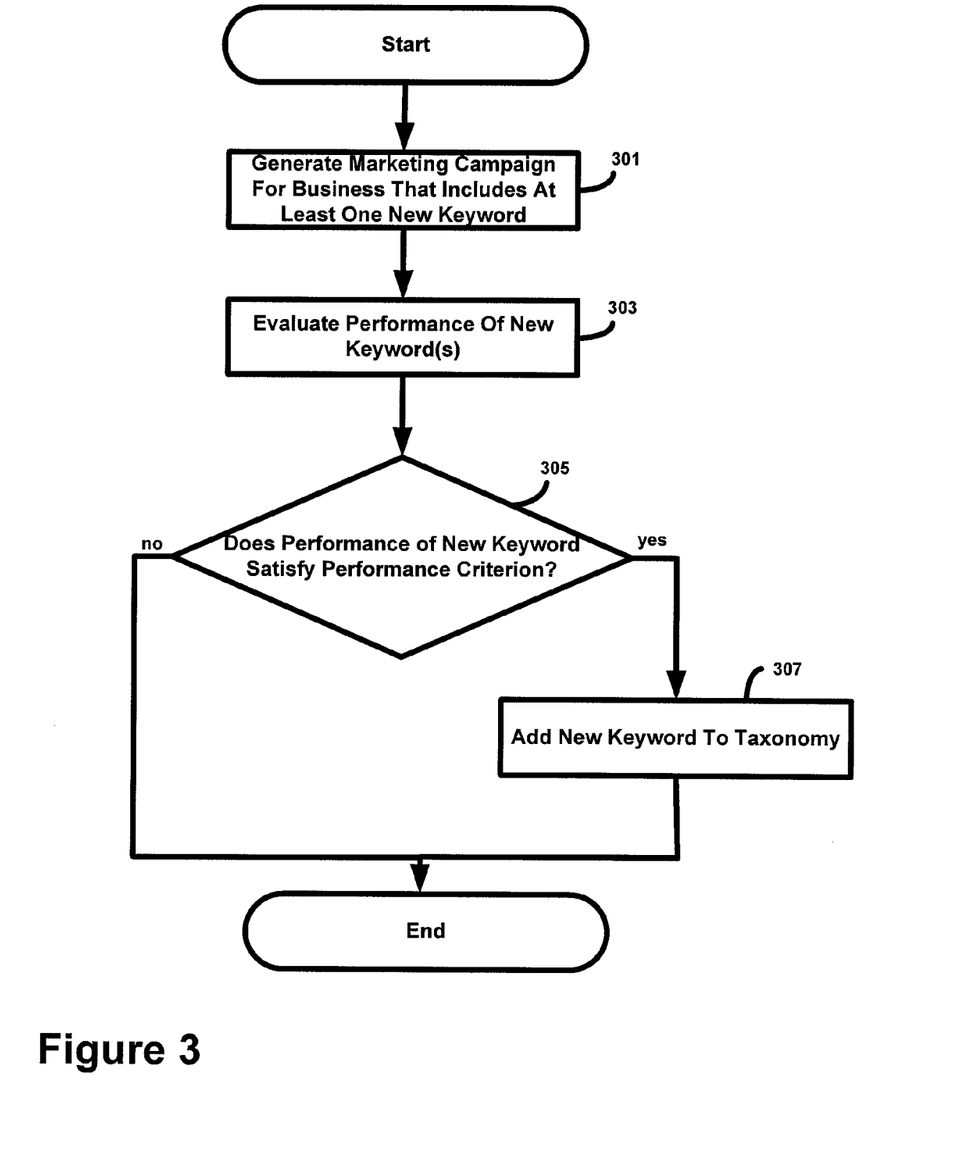
FIG. 3 is a flow chart of an illustrative process for adding a keyword to a keyword taxonomy.

FIG. 3 shows an illustrative process for adding a new keyword to the template for a business service category in the taxonomy. At act 301, a marketing campaign for a business is generated that includes at least one new keyword that is not in the keyword template for the business' business service category or categories. The process then continues to 303, where the performance of the at least one new keyword is evaluated. The process next continues to act 305, where it is determined whether the performance of the at least one new keyword satisfies at least one performance criterion. When it is determined at act 305 that the at least one new keyword satisfies the performance criterion, the process continues to act 307, where the at least one new keyword is added to the template for the business service category or categories to which the business belongs. As mentioned above, this may be done in any suitable way (e.g., by the business, by the server 203 in FIG. 2, or otherwise, and using any desired evaluation criterion or criteria). However, when it is determined at act 305 that the at least one new keyword does not satisfy the performance criterion or criteria, the at least one new keyword is not added to the template, and the process ends.

The performance of a keyword may be evaluated in any suitable way using any suitable criterion or criteria. For example, in some embodiments, the number of "clicks," or web site visits generated by a particular keyword for a particular business may be tracked, and a keyword that generates at least a threshold number of web site visits over a particular period of time may be added into the keyword taxonomy. However, any other suitable criterion or criteria may be used to evaluate the performance of a keyword, such as a measurement of the percentage of web site visits that have resulted in new customers for the business, or any other suitable criterion.

In some embodiments, when a new keyword is added to the template for a business service category, the marketing campaigns of businesses who belong to that category may be automatically updated to include the new keyword. For example, in FIG. 2, business A and business B may both have companies belonging to the same business service category. Marketing campaign 207*a* for business A may include a non-template keyword that is not in marketing campaign 207*b* for business B. If it is determined that this keyword should be added to the template for the business service category in which businesses A and B belong, the keyword may be added to the template, and marketing campaign 207*b* for business B may be automatically updated to include this keyword.

In some embodiments, keywords in the template for a business service category that have not performed well may be removed from the keyword taxonomy. This may be done in any suitable way, as the invention is not limited in this respect. For example, in some embodiments, the performance of a keyword that appears in the marketing campaign for multiple businesses in the same business service category may be tracked (e.g., by server 203 or in any other suitable way) in each of these marketing campaigns. A keyword that performs poorly (e.g., across a large number of marketing campaigns for businesses in the same business service category or otherwise) may be removed from the template for the business service category.

Server 203 may be implemented in any suitable way, as the invention is not limited in this respect. In the example of FIG. 2, server 203 is shown as a single computer. However, the invention is not limited in this respect as server 203 may comprise a plurality of interconnected computers and all marketing campaigns managed by server 203 need not be stored on a single computer.

In some embodiments, server 203 may be operated by a business that consults with other businesses to advise them with respect to advertising campaigns. Thus, for example, businesses A, B, . . . , n in FIG. 2 may be clients of the business that operates server 203, and may have hired the business that operates server 203 to assist in generating and managing their marketing campaigns.

It should be appreciated that the keyword taxonomy discussed above may be globally managed for any suitable number of marketing campaigns and/or business (e.g., at least 10, at least 100, at least 1000, or any other suitable number), and the invention is not limited in this respect. It should further be appreciated that keyword taxonomy may be updated by adding new keywords or removing old keywords based on the performance of any suitable number (e.g., at least 10, at least 100, at least 1000, or any other suitable number) of marketing campaigns (which may include all of the campaigns based on the taxonomy or some subset thereof) or the performance of marketing campaigns for any suitable number of businesses (e.g., at least 10, at least 100, at least 1000, or any other suitable number).

As discussed above, once a list of keywords for a marketing campaign is generated, the keywords may be purchased from one or more search engines by placing bids on these keywords with the search engine. The amount that is bid on a keyword may affect the amount of traffic to a business' web site, as higher bids tend to result in the business' advertisement being displayed more frequently and/or more prominently, which tends to generate more visits to the business' web site. As mentioned above, in a typical billing arrangement with a search engine, each time the hyperlink to the business' web site that appears in the business' advertisement is clicked, the business is charged the bid amount for that keyword. Thus, higher bids for keywords also tend to increase advertising costs for a business.

Consequently, it is common for a business to define a target spending amount for a campaign over a given period of time and attempt to set bids for its keywords so that the total amount of spending comes as close as possible to the target, or to set bids for its keywords based on some other measure of performance of the keywords. Conventional techniques for accomplishing this involve one of two approaches for setting bids. One conventional approach is a model-based predictive approach that employs a statistical or mathematical model which takes historical data as input and makes assumptions based on this data to try to predict bid amounts that will result in performance close to the target. Examples of model-based predictive approaches include: logistic regression, linear regression, CHAID analysis, Markowitz portfolio theory, mathematical programming optimization, clustering, and support vector machines. Applicants have appreciated that one problem which such an approach is that if the input data to the model is sparse or noisy, or if the assumptions made in the model are incorrect, the keyword bids set by this approach may result in performance that differs significantly from the target.

Another conventional approach to setting bids is a rule-based responsive approach. Unlike the modeling approach which attempts to predict appropriate bids, the rule-based responsive approach is reactive and adjusts bids in response to how close previous performance was to the target. In such approaches, bids are incrementally raised or lowered based on observed previous performance. Applicants have appreciated that such approaches are slow to make large changes in bids, as they adjust bids incrementally and wait to evaluate the effects of the adjustment before adjusting again. In addition, Applicants have appreciated that such approaches may be inaccurate, as the appropriate bid amounts one day may be different than the appropriate bid amounts on another day as a result of factors that the rule-based responsive approach does not take into account.

Applicants have appreciated that the weaknesses of these conventional bidding approaches can be addressed by employing a hybrid approach, in which two different processes are used to set bids. For example, in some embodiments, the first process may be a process that sets bids using a model-based predictive approach, and the second process may be a process that sets bids using a rule-based responsive approach. In some embodiments, bids set using the modeling approach may be evaluated to determine if they satisfy at least one evaluation criterion. Any suitable model may be used for the modeling approach and any suitable rule-based responsive approach may be used, as the invention is not limited in this respect.

Figure 4:
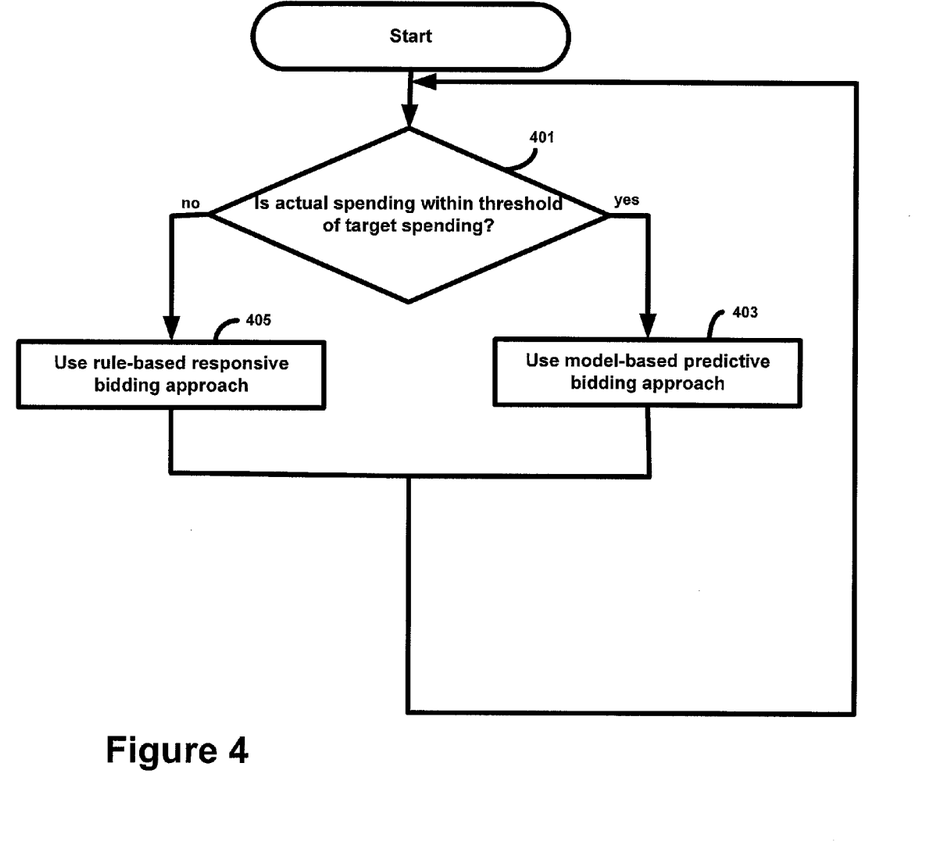
FIG. 4 is a flow chart of an illustrative process for adjusting keyword bids in an online marketing campaign.

In some embodiments, the evaluation criterion that may be used to determine which approach to use in setting bids may be the total spending of the marketing campaign relative to a spending target. FIG. 4 illustrates an example of a process for employing a hybrid approach to setting keyword bids. The process begins at act 401, where it is determined whether the actual spending of the marketing campaign is within a threshold amount of target spending over a given period of time. If it is, the evaluation criterion may be considered to be satisfied and the process continues to act 403 where the model-based predictive approach may be used to set keyword bids. If, at act 401, it is determined that the actual spending over the time period is not within the threshold amount of the target, then the process continues to act 403 where the rule-based responsive approach may be used to set keyword bids. After a certain amount of time, the process then returns to act 401, where it is determined whether the actual spending of the marketing campaign is within a threshold amount of target spending over a subsequent period of time, and the process of FIG. 4 repeats.

In the example above, any suitable threshold amount may be used, as the invention is not limited for this respect. For example, the threshold amount may be $5, $10, $50, or any other suitable amount.

If the actual spending over the time period is not within the threshold amount of the target, then rule-based responsive approach may adjust keyword bids by an amount that is based on the amount by which actual spending exceeded or fell short of target spending. For example, in some embodiments, a spend deviation may be determined by taking the absolute value of actual spending minus target spending, and spend deviation percentage may be determined by dividing the spend deviation by the target spending.

In some embodiments, if actual spending is less than target spending by more than the threshold amount, and the spend deviation percentage is greater than 50%, then the marketing campaign may be classified as "large underspend." Otherwise, if the spend deviation is less than 50% but greater than 5% or greater than $20, the marketing campaign may be classified as "small underspend." If the actual spending exceeds target spending by more than the threshold amount and the spend deviation is greater than 75%, then the marketing campaign may be classified as "large overspend." Otherwise, if the spend deviation is less than 75% but greater than 25%, the marketing campaign may be classified as "small overspend."

If the marketing campaign as classified as either "large underspend" or "small underspend," the rule-based responsive process may be decrease keyword bids, and the amount by which these bids are decreased may depend on whether the campaign is classified as "large underspend" or "small underspend." Similarly, if the marketing campaign is classified as either "large overspend" or "small overspend," the rule-based responsive process may be increase keyword bids, and the amount by which these bids are increased may depend on whether the campaign is classified as "large overspend" or "small overspend."

The performance of a marketing campaign may be evaluated at any suitable interval. For example, in some embodiments, the performance of a marketing campaign may be evaluated daily. However, the invention is not limited in this respect, as any other interval may be used, such as hourly, weekly, bi-weekly, monthly, or any other suitable interval. In addition, the interval at which the performance of a marketing campaign is evaluated need not be a regular interval, as any suitable regular or irregular interval may be used. Thus, in the example described above, the process of FIG. 4 may be repeated hourly, daily, weekly, bi-weekly, or at any other suitable regular or irregular interval.

In the example above, the first process for adjusting keyword bids uses a modeling approach and the second process for adjusting keyword bids uses a rule-based responsive approach. However, the invention is not limited in this respect, as either process may use any suitable approach for setting or adjusting keyword bids. For example, in some embodiments, both processes may use a modeling approach, both processes may use a rule-based responsive approach, or either process may use some other approach.

In the example above, the evaluation criterion is indicative of how close actual spending on a market campaign comes to a spending target. However, the invention is not limited in this respect, as any suitable evaluation criterion may be used. For example, in some embodiments in which the one or more of the processes uses a model-based predictive approach to setting or adjusting bids, the evaluation criterion may be a goodness-of-fit measurement that is indicative of how well the model(s) of the approach(es) fits the circumstances. In some embodiments, the evaluation criterion may be indicative of how each process for setting bids has historically performed. In some embodiments, the evaluation criterion may be indicative of the performance of the marketing campaign.

For example, the evaluation criterion may indicative of a cost-per-click, or the number of conversions, or the cost per conversion. A conversion occurs when, after "clicking" on a business' advertisement, a user takes some other action that is beneficial to the business, such as purchasing goods or services from the business, requesting additional information about the business or its goods or services, filling out a form or survey indicating interest in the business or its goods or services, signing up for a mailing list, or any other suitable action.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Figure 5:
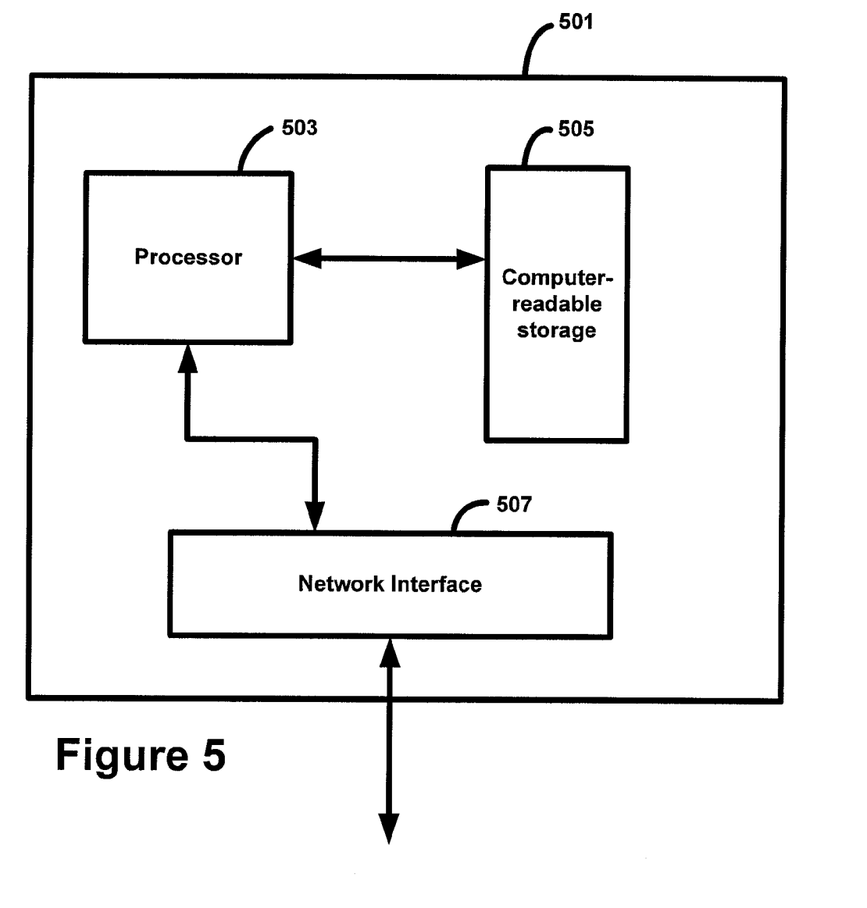
FIG. 5 is a block diagram of an illustrative computer on which some embodiments may be implemented.

Any suitable type of computer may be used. FIG. 5 illustrates an example of one such computer 501, which includes a processor 503, computer-readable storage 505, and a network interface 507. The software code may include instructions stored in computer-readable storage 505 which are retrieved from the computer-readable storage and executed by processor 503. Computer-readable storage 505 may comprise any suitable type of physical storage medium, such as, for example, RAM, ROM, magnetic disk, optical disk, Flash memory, and/or any combination thereof. Computer 501 may send data to and receive data from other computers via network interface 507.

It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. The one or more controllers may be included in one or more host computers, one or more storage systems, or any other type of computer that may include one or more storage devices coupled to the one or more controllers.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer.

Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," or "having," "containing", "involving", and variations thereof herein, is meant to encompass the items listed thereafter and additional items.

Having described several embodiments of the invention in detail, various modifications and improvements will readily occur to those skilled in the art. Such modifications and improvements are intended to be within the spirit and scope of the invention.

Accordingly, the foregoing description is by way of example only, and is not intended as limiting. The invention is limited only as defined by the following claims and the equivalents thereto.

What is claimed is:

1. A method for generating keywords to be used in an online marketing campaign, the method comprising acts of:
reviewing at least one taxonomy that specifies at least one business service category and a list of keywords that represent a proposed best practices list of keywords for the at least one business service category for use in a search engine and/or online directory;
specifying a listing type for each of a plurality of keywords in the at least one taxonomy in the proposed best practices list of keywords, wherein the plurality of keywords includes a first keyword and a second keyword, wherein the listing type for the first keyword specifies that the first keyword is a search engine keyword to be purchased, wherein the listing type for the second keyword specifies that the second keyword is an online directory category in which to purchase a listing;

adapting, using at least one processor, the at least one taxonomy based on a collective performance of online marketing campaigns, wherein the performance of online marketing campaigns for at least one hundred businesses is evaluated in determining whether to adapt the taxonomy, and the adapting includes adding and/or removing at least one keyword from the at least one taxonomy;

adopting, using the at least one processor, a first online marketing campaign for a first business that is based, at least in part, on the taxonomy but that employs at least one new keyword for the at least one business service category that is not included in the proposed best practices list;

after adopting the first online marketing campaign, evaluating a performance of the at least one new keyword in the first online marketing campaign; and adding the at least one new keyword to the best practices list of keywords for the at least one business service category, when it is determined that the at least one new keyword satisfies at least one performance criterion.

2. The method of claim 1, wherein the list of keywords comprises positive keywords, negative keywords and geographical modifier keywords.

3. The method of claim 1, wherein the taxonomy is globally managed for a plurality of online marketing campaigns for a plurality of distinct businesses.

4. The method of claim 3, wherein the taxonomy is adaptive based on the performance of the online marketing campaigns for each of the plurality of distinct businesses.

5. The method of claim 3, wherein the plurality of distinct businesses comprises at least one hundred businesses.

6. The method of claim 3, wherein the plurality of distinct businesses comprises at least one thousand businesses.

7. The method of claim 2, wherein the act of adopting the campaign comprises an act of taking a cross-product of the positive keywords and the geographical modifier keywords.

8. The method of claim 7, wherein the act of adopting the campaign further comprises placing a bid with a search engine for each concatenation of a positive keyword and geographical modifier keyword.

9. At least one non-transitory computer readable storage medium encoded with instructions that, when executed on a computer system, perform a method for generating keywords to be used in an online marketing campaign, the method comprising acts of:

reviewing at least one taxonomy that specifies at least one business service category and a list of keywords that represent a proposed best practices list of keywords for the at least one business service category for use in a search engine and/or online directory specifying a listing type for each of a plurality of keywords in the at least one taxonomy in the proposed best practices list of keywords, wherein the plurality of keywords includes a first keyword and a second keyword, wherein the listing type for the first keyword specifies that the first keyword is a search engine keyword to be purchased, wherein the listing type for the second keyword specifies that the second keyword is an online directory category in which to purchase a listing;

adapting the at least one taxonomy based on a collective performance of online marketing campaigns, wherein the performance of online marketing campaigns for at least one hundred businesses is evaluated in determining whether to adapt the taxonomy, and the adapting includes adding and/or removing at least one keyword from the at least one taxonomy;

adopting a first online marketing campaign for a first business that is based, at least in part, on the taxonomy but that employs at least one new keyword for the at least one business service category that is not included in the proposed best practices list;

after adopting the first online marketing campaign, evaluating a performance of the at least one new keyword in the first online marketing campaign; and adding the at least one new keyword to the best practices list of keywords for the at least one business service category, when it is determined that the at least one new keyword satisfies at least one performance criterion.

10. The at least one non-transitory computer readable storage medium of claim 9, wherein the list of keywords comprises positive keywords, negative keywords and geographical modifier keywords.

11. The at least one non-transitory computer readable storage medium of claim 9, wherein the taxonomy is globally managed for a plurality of online marketing campaigns for a plurality of distinct businesses.

12. The at least one non-transitory computer readable storage medium of claim 11, wherein the taxonomy is adaptive based on the performance of the online marketing campaigns for each of the plurality of distinct businesses.

13. The at least one non-transitory computer readable storage medium of claim 11, wherein the plurality of distinct businesses comprises at least one hundred businesses.

14. The at least one non-transitory computer readable storage medium of claim 11, wherein the plurality of distinct businesses comprises at least one thousand businesses.

15. The at least one non-transitory computer readable storage medium of claim 10, wherein the act of adopting the campaign comprises an act of taking a cross-product of the positive keywords and the geographical modifier keywords.

16. The at least one non-transitory computer readable storage medium of claim 15, wherein the act of adopting the campaign further comprises placing a bid with a search engine for each concatenation of a positive keyword and geographical modifier keyword.

17. A method of adaptively updating at least one taxonomy that specifies at least one business service category and a list of keywords that represent a proposed best practices list of keywords for the at least one business service category for use in a search engine and/or online directory, the method comprising acts of:

generating, using at least one processor, a plurality of online marketing campaigns for a plurality of businesses, using the proposed best practices list of keywords, so that each of the plurality of online marketing campaigns includes at least one keyword from the proposed best practices list and at least some of the plurality of online marketing campaigns include at least one new keyword;

specifying a listing type for each of a plurality of keywords in the at least one taxonomy in the proposed best practices list of keywords, wherein the plurality of keywords includes a first keyword and a second keyword, wherein the listing type for the first keyword specifies that the first keyword is a search engine keyword to be purchased, wherein the listing type for the second keyword specifies that the second keyword is an online directory category in which to purchase a listing;

adapting, using at least one processor, the at least one taxonomy based on a collective performance of the plurality of online marketing campaigns, wherein the performance of online marketing campaigns for at least one hundred businesses is evaluated in determining whether to adapt the taxonomy, and the adapting includes adding and/or removing at least one keyword from the at least one taxonomy;

after generating the plurality of online marketing campaigns for the plurality of businesses, evaluating a performance of the at least one new keyword in the at least some of the plurality of online marketing campaigns that include the at least one new keyword;

determining whether the at least one new keyword satisfies at least one performance criterion;

updating the at least one taxonomy to add the at least one new keyword to the best practices list of keywords for the at least one business service category, so that at least one online marketing campaign may be based upon the at least one new keyword, when it is determined that the at least one new keyword satisfies the at least one performance criterion.

18. The method of claim 17, wherein the list of keywords comprises positive keywords, negative keywords and geographical modifier keywords.

19. The method of claim 17, wherein the plurality of marketing campaigns comprises at least one hundred marketing campaigns.

20. The method of claim 17, wherein the plurality of marketing campaigns comprises at least one thousand marketing campaigns.

21. The method of claim 18, wherein the act of generating the plurality of marketing campaigns comprises an act of taking a cross-product of the positive keywords and the geographical modifier keywords.

22. The method of claim 21, wherein the act of generating the plurality of marketing campaigns further comprises placing a bid with a search engine for each concatenation of a positive keyword and geographical modifier keyword.

23. At least one computer for adaptively updating at least one taxonomy that specifies at least one business service category and a list of keywords that represent a proposed best practices list of keywords for the at least one business service category for use in a search engine and/or online directory, the at least one computer comprising:
    at least one physical memory that stores the at least one taxonomy; and
    and at least one controller, coupled to the at least one physical memory, that:
        generates, using at least one processor, a plurality of online marketing campaigns for a plurality of businesses, using the proposed best practices list of keywords, so that each of the plurality of online marketing campaigns includes at least one keyword from the proposed best practices list and at least some of the plurality of online marketing campaigns include at least one new keyword;
        specifies a listing type for each of a plurality of keywords in the at least one taxonomy in the proposed best practices list of keywords, wherein the plurality of keywords includes a first keyword and a second keyword, wherein the listing type for the first keyword specifies that the first keyword is a search engine keyword to be purchased, wherein the listing type for the second keyword specifies that the second keyword is an online directory category in which to purchase a listing;
        adapts, using the at least one processor, the at least one taxonomy based on a collective performance of the plurality of online marketing campaigns, wherein the performance of online marketing campaigns for at least one hundred businesses is evaluated in determining whether to adapt the taxonomy, and the adapting includes adding and/or removing at least one keyword from the at least one taxonomy;
        after generating the plurality of online marketing campaigns for the plurality of businesses, evaluates a performance of the at least one new keyword in the at least some of the plurality of online marketing campaigns that include the at least one new keyword;
        determines whether the at least one new keyword satisfies at least one performance criterion; and
        updates the at least one taxonomy to add the at least one new keyword to the best practices list of keywords for the at least one business service category, so that at least one online marketing campaign may be based upon the at least one new keyword, when it is determined that the at least one new keyword satisfies the at least one performance criterion.

24. The at least one computer of claim 23, wherein the list of keywords comprises positive keywords, negative keywords and geographical modifier keywords.

25. The at least one computer of claim 23, wherein the plurality of marketing campaigns comprises at least one hundred marketing campaigns.

26. The at least one computer of claim 23, wherein the plurality of marketing campaigns comprises at least one thousand marketing campaigns.

27. The at least one computer of claim 24, wherein the at least one controller generates the marketing campaigns by taking a cross-product of the positive keywords and the geographical modifier keywords.

28. The at least one computer of claim 27, wherein the at least one controller generates the plurality of marketing campaigns by placing a bid with a search engine for each concatenation of a positive keyword and geographical modifier keyword.

29. The method of claim 1, wherein:
    the at least one business service category comprises a plurality of business service categories; and
    the taxonomy is organized hierarchically such that business service categories in the plurality of business service categories are grouped into one or more business segments.

30. The non-transitory computer readable storage medium of claim 9, wherein:
    the at least one business service category comprises a plurality of business service categories; and
    the taxonomy is organized hierarchically such that business service categories in the plurality of business service categories are grouped into one or more business segments.

31. The method of claim 17, wherein:
    the at least one business service category comprises a plurality of business service categories; and
    the taxonomy is organized hierarchically such that business service categories in the plurality of business service categories are grouped into one or more business segments.

32. The at least one computer of claim 23, wherein:
    the at least one business service category comprises a plurality of business service categories; and
    the taxonomy is organized hierarchically such that business service categories in the plurality of business service categories are grouped into one or more business segments.

33. The method of claim 3, wherein:
the plurality of distinct businesses comprises a first business and a second business; and
an online marketing campaign for the first business is altered based at least in part on performance for a keyword in an online marketing campaign for the second business.

34. The non-transitory computer readable storage medium of claim 11, wherein:
the plurality of distinct businesses comprises a first business and a second business; and
an online marketing campaign for the first business is altered based at least in part on performance for a keyword in an online marketing campaign for the second business.

35. The method of claim 17, wherein:
the plurality of businesses comprises a first business and a second business; and
an online marketing campaign for the first business is altered based at least in part on performance for a keyword in an online marketing campaign for the second business.

36. The at least one computer of claim 23, wherein:
the plurality of businesses comprises a first business and a second business; and
a first online marketing campaign for the first business is altered based at least in part on performance for a keyword in a second online marketing campaign for the second business.

37. The method of claim 1, wherein adopting the first online marketing campaign further comprises purchasing the at least one new keyword from the search engine.

38. The at least one non-transitory computer readable storage medium of claim 9,
wherein adopting the first online marketing campaign further comprises purchasing the at least one new keyword from the search engine.

39. The method of claim 1, wherein adopting the first online marketing campaign further comprises:
placing a bid with a search engine on at least one keyword in the proposed best practices list by setting the bid based at least in part on performance of the at least one keyword in at least one marketing campaign.

40. The at least one non-transitory computer readable storage medium of claim 9, wherein adopting the first online marketing campaign further comprises:
placing a bid with a search engine on at least one keyword in the proposed best practices list by setting the bid based at least in part on performance of the at least one keyword in at least one marketing campaign.

41. The method of claim 17, wherein:
the online marketing campaign for a business may be adopted by the business at least in part by the business placing a bid on the at least one keyword in the proposed best practices list by setting the bid based at least in part on performance of the at least one keyword in at least one marketing campaign.

42. The at least one computer of claim 23, wherein:
the online marketing campaign for a business may be adopted by the business at least in part by the business placing a bid on the at least one keyword in the proposed best practices list by setting the bid based at least in part on performance of the at least one keyword in at least one marketing campaign.

* * * * *